D. BASCH.
PROTECTIVE MEANS FOR ELECTRICAL DISTRIBUTION SYSTEMS.
APPLICATION FILED NOV. 13, 1916.
1,246,038.
Patented Nov. 13, 1917.
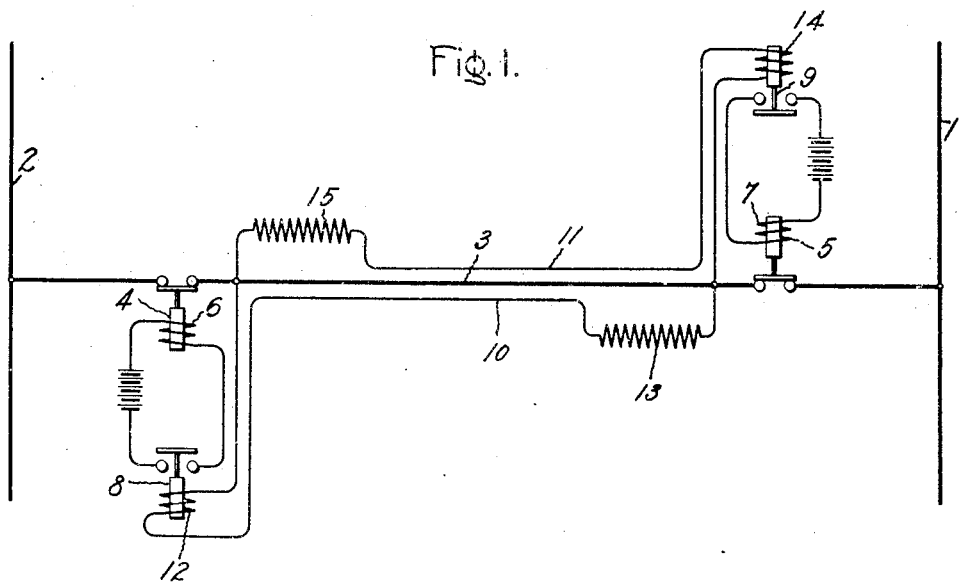
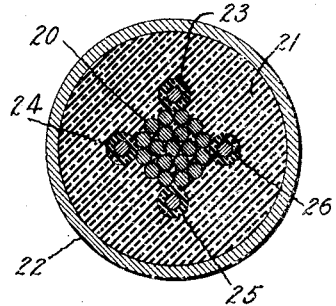
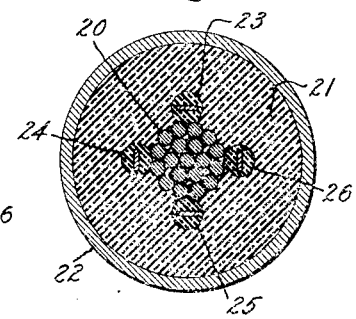
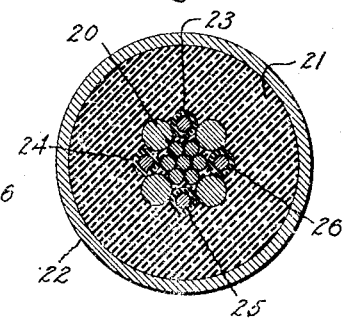
Inventor:
David Basch,
by
His Attorney.

UNITED STATES PATENT OFFICE.

DAVID BASCH, OF SCHENECTADY, NEW YORK, ASSIGNOR TO GENERAL ELECTRIC COMPANY, A CORPORATION OF NEW YORK.

PROTECTIVE MEANS FOR ELECTRICAL DISTRIBUTION SYSTEMS.

1,246,038. Specification of Letters Patent. Patented Nov. 13, 1917.

Application filed November 13, 1916. Serial No. 131,011.

*To all whom it may concern:*

Be it known that I, DAVID BASCH, a citizen of the United States, residing at Schenectady, county of Schenectady, State of New York, have invented certain new and useful Improvements in Protective Means for Electrical Distribution Systems, of which the following is a specification.

My present invention relates to protective devices for electrical distribution systems and more particularly to systems in which insulated cables are employed as transmission conductors.

The object of my invention is to provide a simple and effective means for disconnecting from the distribution system a faulty section of cable before the remainder of the distribution system is damaged by reason of the abnormal conditions which may arise by reason of the fault.

It has heretofore been proposed to employ auxiliary protective conductors in parallel with the main cable conductors in such a way that, when a fault occurs in the cable, currents will be caused to flow in the protective conductors of sufficient amount to operate switching or other apparatus for disconnecting the faulty cable from the remainder of the distribution system. These protective conductors have been embedded in the insulation of the cable in such a manner that when the insulation breaks down a connection will be formed between the protective conductor and the main conductor. The current flowing through this connection has been employed for the operation of the protective apparatus. In all of the prior systems of this type of which I am aware a single protective conductor or the equivalent of a single conductor only has been employed and the connections have been so arranged that considerable potential differences may exist between the main and auxiliary conductors during the normal operation of the system. In such cases there is danger of a fault developing in the insulation between the two conductors which may affect the entire insulation of the cable and cause a breakdown of the distribution system.

In carrying my invention into effect I employ two separate conductors in parallel with the main conductor and connect them to the main conductor in such a way that only small potential differences can be present between the main and auxiliary conductors during the normal operation of the system. One of these auxiliary conductors serves to disconnect one end of the cable section with which it is associated and the other conductor serves to disconnect the opposite end.

The novel features which I believe to be characteristic of my invention are set forth with particularity in the appended claims. My invention itself however, together with further objects and advantages, will best be understood by reference to the following description taken in connection with the accompanying drawing in which Figure 1 illustrates diagrammatically the application of my invention to a distribution system, and Figs. 2, 3 and 4 are cross-sectional views of three different forms of cable which may be employed in carrying my invention into effect.

In Fig. 1, I have indicated a distribution system comprising distribution conductors 1 and 2 which are connected by a section of cable 3. While for convenience in illustration I have shown a single conductor, it will of course be understood that the system may have as many conductors as required for the particular method of distribution employed. Disconnecting switches 4 and 5 are provided at the ends of the cable section, the trip coils 6 and 7 of the switches being included in local circuits which are closed by switches 8 and 9. Two auxiliary conductors 10 and 11 parallel the main conductor and are connected thereto at both ends. One end of conductor 10 is connected to one end of the main conductor through trip coil 12 of switch 8 and the other end is connected to the other end of the main conductors through a reactance 13. Similarly one end of conductor 11 is connected to one end of the main conductor through the trip coil 14 of switch 9 and the other end is connected to the opposite end of the main conductor through the reactance 15.

These reactances should have such a value that under normal conditions of operation of the cable section there cannot be a sufficient flow of current through the auxiliary conductors to operate the switches 8 and 9. They should also be so proportioned that even under heavy short circuit conditions in some other portion of the system, the drop of potential across the reactances will be small and hence only small potential differences may be set up between the main and auxiliary conductors at any point. This may be accomplished by designing the reactances so that they will become saturated at relatively low current values.

In Fig. 2 I have shown a cable which may be used in carrying my invention into effect. This consists of the usual stranded conductor 20 surrounded by insulating material 21 and a protective lead sheath 22. Four auxiliary conductors 23, 24, 25 and 26 are grouped around the main conductor 20 at equal intervals and embedded in the insulation 21. For convenience in manufacture these auxiliary conductors may be lightly insulated individually, as shown, and such insulation will be all that is required between them and the main conductor. Two of these auxiliary conductors, 23 and 25 for example, may be connected together at their ends to form one of the protective conductors and the other two, 24 and 26, may form the second protective conductor. In case a fault develops anywhere in the cable, the insulation will be broken down between the main and auxiliary conductors at once and this will cause a short circuiting of the reactances 13 and 15, thus allowing sufficient current to flow through the auxiliary conductors to operate switches 8 and 9. It may be sufficient to use only two auxiliary conductors, although by providing a larger number of conductors and grouping them at intervals around the cable there is little possibility of a fault developing without affecting a portion at least of the auxiliary conductors.

In Figs. 3 and 4 I have shown other forms of cable which differ from the one shown in Fig. 2 merely in the form of the conductors used. While the cables shown have but a single main conductor, it will be apparent that a similar construction may equally well be employed with cables having a plurality of main current carrying conductors.

What I claim as new and desire to secure by Letters Patent of the United States, is,—

1. Protective means for an electrical distribution system which includes a section of cable, comprising a disconnecting switch at each end of the cable section, two separate auxiliary conductors associated with the main cable conductor but insulated therefrom, tripping means for the disconnecting switch at each end of the cable section, the tripping means at one end being associated with one of the auxiliary conductors and the tripping means at the other end being associated with the second auxiliary conductor, each of said auxiliary conductors being connected to the main cable conductor at one end of the cable section through the tripping means with which it is associated and at the other end through an impedance.

2. Protective means for an electrical distribution system which includes a section of cable, comprising a disconnecting switch at each end of the cable section, two separate auxiliary conductors associated with the main cable conductor but insulated therefrom, tripping means for the disconnecting switch at each end of the cable section, the tripping means at one end being associated with one of the auxiliary conductors and the tripping means at the other end being associated with the second auxiliary conductor, each of said auxiliary conductors being connected to the main cable conductor at one end of the cable section through the tripping means with which it is associated and at the other end through a reactance so designed that it will become saturated at a low current value.

3. Protective means for an electrical distribution system which includes a section of cable, comprising a disconnecting switch at each end of the cable section, two separate auxiliary conductors associated with the main cable conductor but insulated therefrom, tripping means for the disconnecting switch at each end of the cable section, the tripping means at one end being associated with one of the auxiliary conductors and the tripping means at the other end being associated with the second auxiliary conductor, each of said auxiliary conductors being connected to the main cable conductor at one end of the cable section through the tripping means with which it is associated and at the other end through an impedance, said impedance being so proportioned that the tripping means will operate only in case the impedance is short circuited by a fault in the cable.

4. Protective means for an electrical distribution system which includes a section of cable, comprising a disconnecting switch at each end of the cable section, two separate parallel auxiliary conductors, tripping means for the disconnecting switch at each end of the cable section, one of the auxiliary conductors being connected to the main cable conductor through the tripping means at one end of the cable section and the second auxiliary conductor being connected to the main cable conductor through the tripping means at the opposite end of the cable section.

5. Protective means for an electrical distribution system which includes a section of cable, comprising two separate auxiliary parallel conductors associated with the main cable conductor and insulated therefrom throughout their length but connected to the main conductor at both ends of the cable section, one of said auxiliary conductors being arranged to control a disconnecting switch at one end of the cable section and the other auxiliary conductor being arranged to control a disconnecting switch at the opposite end of the cable section.

6. Protective means for an electrical distribution system which includes a section of cable, comprising two separate auxiliary parallel conductors associated with the main cable conductor and insulated therefrom throughout their length but connected to the main conductor at both ends of the cable section, one of said auxiliary conductors being arranged to control a disconnecting switch at one end of the cable section and the other auxiliary conductor being arranged to control a disconnecting switch at the opposite end of the cable section, and the whole system being so arranged that in case of a fault occurring in the cable both disconnecting switches will be operated.

In witness whereof, I have hereunto set my hand this 11th day of November, 1916.

DAVID BASCH.

Copies of this patent may be obtained for five cents each, by addressing the "Commissioner of Patents, Washington, D. C."